United States Patent [19]

Bricklin

[11] Patent Number: 5,680,152
[45] Date of Patent: *Oct. 21, 1997

[54] METHOD AND APPARATUS FOR NAVIGATING MULTIPLE INDEPENDENT WINDOWED IMAGES

[75] Inventor: Daniel S. Bricklin, Newton Highlands, Mass.

[73] Assignee: Software Garden, Inc., Newton Highlands, Mass.

[*] Notice: The term of this patent shall not extend beyond the expiration date of Pat. No. 5,621,430.

[21] Appl. No.: 627,650

[22] Filed: Apr. 4, 1996

Related U.S. Application Data

[63] Continuation of Ser. No. 298,215, Aug. 29, 1994, Pat. No. 5,621,430.
[51] Int. Cl.$^6$ ........................................ G09G 5/14
[52] U.S. Cl. ........................ 345/119; 345/121; 345/123
[58] Field of Search .................................. 345/123, 118, 345/119, 120, 121, 124, 125, 115, 127, 145; 395/144, 145, 146, 147, 156, 157, 158, 159

[56] References Cited

U.S. PATENT DOCUMENTS

| 4,744,046 | 5/1988 | Foster | 345/123 |
| 5,263,134 | 11/1993 | Paul et al. | 345/123 |

*Primary Examiner*—Regina D. Liang
*Attorney, Agent, or Firm*—Hecker & Harriman

[57] ABSTRACT

A method and apparatus for navigating multiple independent windowed images on a computer display screen of a computer system is presented. The images may be of arbitrary size and shape, although a rectangular shape is typically used. A relationship is defined between the coordinates of points in one image and the coordinates of points in each of the other images. All or a portion of an image is shown in a window for each image. An indicator in one window determines the portion of an image shown in another window. Each image is an independent entity, although its content may be thematically related to the content of other windows. Each image is typically a bitmap. A cursor may be used to control the position of the indicator. Graphic objects and items may optionally be "drag-and-dropped" into any window.

14 Claims, 8 Drawing Sheets

METHOD AND APPARATUS FOR NAVIGATING MULTIPLE INDEPENDENT WINDOWED IMAGES

This is a continuation of application Ser. No. 08/298,215, filed Aug. 29, 1994, U.S. Pat. No. 5,621,430.

BACKGROUND OF THE INVENTION

1. Field of the Invention

The present invention relates to the field of user interfaces for computers, and more particularly to a method and apparatus for navigating multiple windowed images that may be used to provide an improved graphical user interface for computer systems.

2. Background Art

The means by which a computer user communicates with a computer is referred to as the "user interface." A user interface typically consists of computer hardware such as a computer display screen, a keyboard, and a mouse, as well as computer software that interprets a user's keyboard and mouse input and provides the images shown on the computer display screen.

Two categories of user interfaces are text-based user interfaces and graphical user interfaces. With text-based user interfaces, communications between a user and a computer typically consist of written words and messages. User input to the computer with a basic text-based interface consists of text messages and commands typed on the keyboard, and computer output to the user consists of text messages displayed on the computer display screen. More "user friendly" text based interfaces provide additional features such as pull-down command menus and mouse input that make it easier for a user to enter text-based commands.

With graphical user interfaces, also referred to as "GUI's," communications between a user and a computer consist of graphical images as well as written words and messages. A typical graphical user interface provides features such as pull-down menus and pictorial representations called "icons" that allow the user to perform many computer operations simply by using a mouse to point and click on an appropriate icon or menu displayed on the computer display screen.

Graphical user interfaces typically also feature "windows." A "window" is a portion of a display screen that is dedicated to a particular purpose. Two common examples of operating systems that provide windowing graphical user interfaces are Microsoft Windows™ and the Apple Macintosh™ operating systems. A GUI that utilizes "windows" typically divides the display screen into movable, resizable, rectangular windows. Each window may be dedicated to a different file or program, or a single program may use multiple windows to display information in different ways.

A property commonly associated with a window is the ability to "scroll" or "pan" the window. Scrolling or panning is used when the item displayed in a window, for example a graphic image in a drawing program or a document in a word processing program, is too large to be displayed in the window all at the same time. In this case, the window can often be "scrolled" or "panned" to a new position relative to the underlying image or document such that the window shows portions of the underlying image or document that previously were outside of the portion shown in the window. The term "scrolling" shall be used herein to refer to both scrolling and panning.

A means typically provided to a user to allow the user to scroll a window are "scroll bars." A scroll bar typically consists of an image of a bar that is displayed along one side of the window. A box that indicates the position of the window with respect to the underlying image or document is displayed on the bar. The box can be "dragged" along the bar by a mouse. The new position of the box indicates the new position of the window in relation to the underlying image. After the box is dragged to the new position and released, the image shown in the window is replaced with an image corresponding to the window's new position. Two scroll bars are commonly used: a vertical scroll bar alongside one of the sides of the window for scrolling the image shown in the window in a vertical direction and a horizontal scroll bar along the top or bottom of the window for scrolling the image in a horizontal direction. The scroll bars thus allow the user to navigate the image or document underlying the window.

Figure 1:
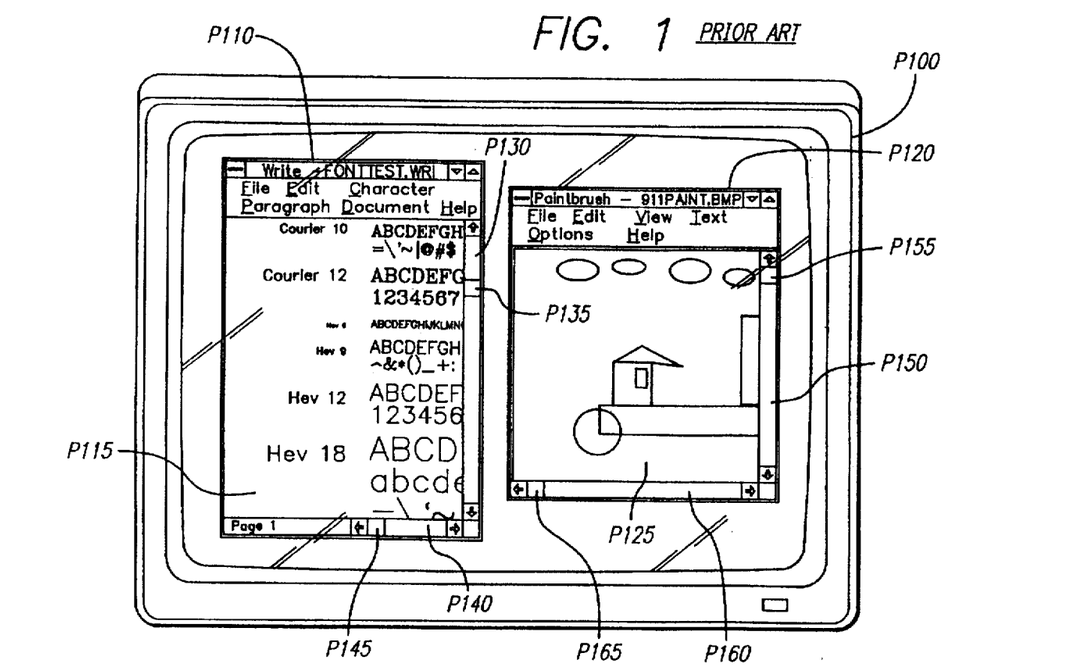
FIG. 1 shows a display screen displaying two windows of the prior art.

If more than one window is shown on a display screen, each window typically has its own scroll bars. Each window scrolls independently: scrolling the image displayed in one window does not scroll the image displayed in other windows. FIG. 1 shows a typical prior art display screen P100 containing two windows P110 and P120. Window P110 is for a word-processing program. It shows a portion P115 of a written document showing different printer fonts and sizes. Window P120 is for a painting program. It shows a portion P125 of a bitmapped image of a locomotive. Window P110 has a vertical scroll bar P130 with a scroll box P135 along its right hand side, and a horizontal scroll bar P140 with a scroll box P145 along its bottom. Window P120 has a vertical scroll bar P150 with a scroll box P155 along its right hand side, and a horizontal scroll bar P160 with a scroll box P165 along its bottom.

Figure 2:
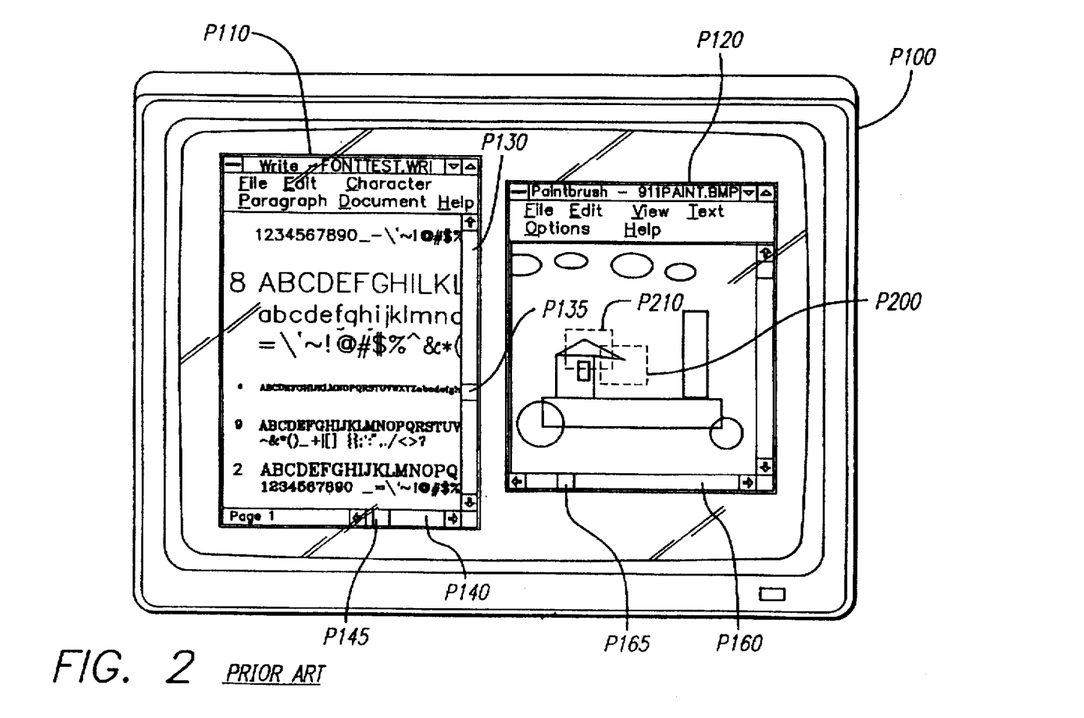
FIG. 2 shows the display screen of FIG. 1 after the prior art windows of FIG. 1 have been scrolled to new positions relative to the underlying image and document.

FIG. 2 shows how moving the scroll boxes along the scroll bars for a window moves the position of the window with respect to the underlying image or document. In FIG. 2, vertical scroll box P135 of window P110 has been dragged vertically downwards from its position in FIG. 1. Accordingly, window P110 has been moved to a position further down the document shown in window P110. Horizontal scroll box P145 of window P110 has also been dragged a distance to the right along horizontal scroll bar 140, scrolling window P110 to the right. In a similar manner horizontal scroll box P165 of window P120 has been dragged a distance to the right along horizontal scroll bar 160, scrolling window P120 to the right as well.

Figure 3:
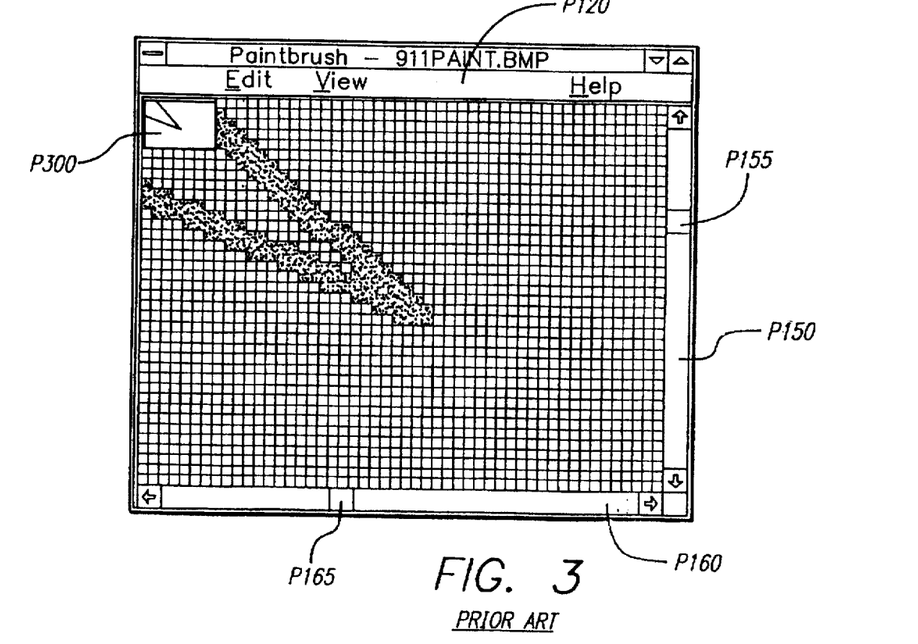
FIG. 3 shows one of the prior art windows of FIG. 2 resized to a larger size that displays an image in magnified form.

Certain prior art programs may display two views of an image simultaneously. The painting program shown in FIG. 2, for example, incorporates a "zoom" mode that shows a magnified view of the displayed image. FIG. 3 shows the painting program window P120 of FIG. 2 with the zoom mode activated and the window as a whole resized to a larger size. Because the image displayed is magnified, window P120 in FIG. 3 only shows a portion of the image displayed in window P120 of FIG. 2. Rectangle P200 shown in outline form in window P120 in FIG. 2 represents the portion of the image shown in window P120 of FIG. 2 that is displayed magnified in window P120 of FIG. 3. As shown in FIG. 3, window P120, in addition to showing the magnified image in its main display area, also includes a small auxiliary window P300 in its upper left-hand corner. Auxiliary window P300 shows an unmagnified view of the same portion of the image shown in magnified form in the main display area of window P120. Thus the prior art program shown in FIG. 3 shows the same image in two windows, but at different scales.

Figure 4:
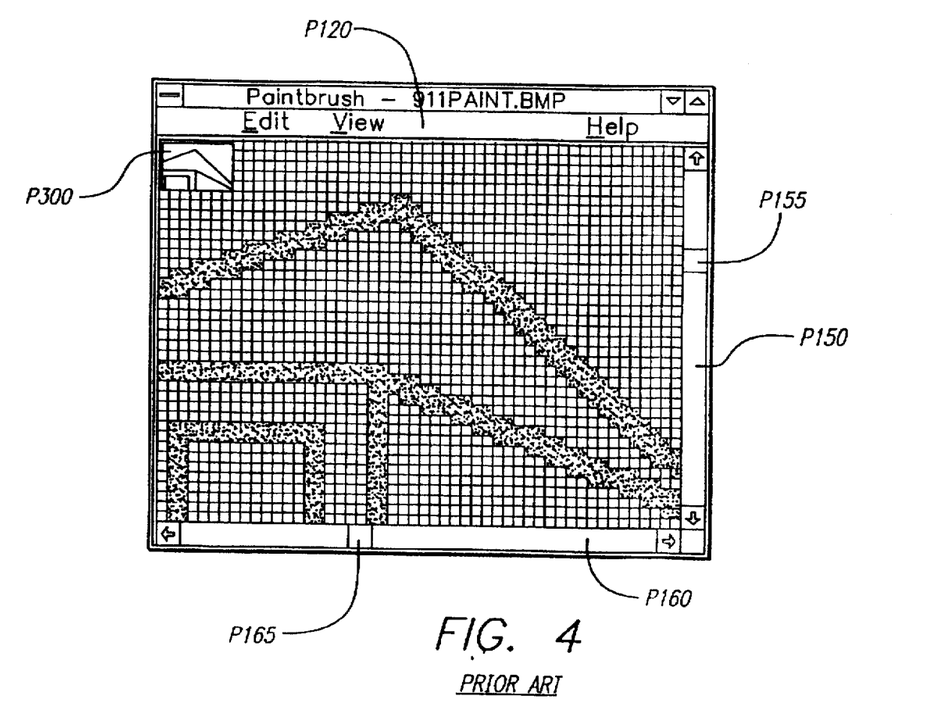
FIG. 4 shows the prior art window of FIG. 3 scrolled to a new position relative to the underlying image.

As in the unmagnified mode shown in FIG. 2, window P120 of FIG. 3 incorporates scroll bars P150 and P160 and scroll boxes P155 and P165, respectively, that can be used to control the position of window 120 with respect to the underlying image. Auxiliary window P300 does not have separate scroll bars. Instead, scroll bars P150 and P160 of window P120 are used to scroll both window P120 and auxiliary window P300. For the prior art program shown in FIG. 3, scrolling of window P120 and auxiliary window P300 is accomplished as follows. As a scroll box in a scroll bar is dragged by a mouse to a new location, the auxiliary window P300 scrolls in real time. That is, as the scroll box is dragged, auxiliary window P300 scrolls to follow the movement of the scroll box. Window P120, however, does not scroll with the movement of the scroll box. Instead, window P120 jumps to the final scrolled position after the scroll box has been moved and the mouse button is released. FIG. 4 shows the images displayed in window P120 and auxiliary window P300 after the scroll boxes P155 and P165 have been moved from their position in FIG. 3. Rectangle P210 shown in outline form in FIG. 2 represents the position of windows P120 and P300 in FIG. 4.

The window navigation scheme of the prior art shown in FIGS. 1 and 2, in which each window shows an independent image, does not provide any coordination between the scrolling of one window and the other. Each window must be scrolled independently. In the window navigation scheme of the prior art shown in FIGS. 3 and 4, scroll bars P150 and P160 control the scrolling of both window P120 and auxiliary window P300. However, the images shown in windows P120 and P300 are not separate, independent images, but are the same image shown at different magnification scales. Furthermore, windows P120 and P300 do not scroll in a coordinated manner: auxiliary window P300 scrolls in real time with movement of the scroll boxes, while window P120 only jumps from the initial position to a final position. The prior art does not provide a method by which multiple, independent images may be navigated in a convenient, coordinated manner.

SUMMARY OF THE INVENTION

The present invention comprises a method and apparatus for navigating multiple independent windowed images on a computer display screen of a computer system. The images may be of arbitrary size and shape, although a rectangular shape is typically used. A relationship is defined between the coordinates of points in one image and the coordinates of points in each of the other images. Each image is an independent entity, although its content may be thematically related to the content of other windows. Each image is typically a bitmap. A window displaying all or a portion of each image is displayed on a display screen. A cursor may be moved into the window for any of the images. Graphic objects and items may optionally be "drag-and-dropped" into any window.

In one embodiment of the present invention, two windows are displayed. One window shows an image that is the same size as the window, such that the window displays the entire image. This window may be referred to as a "first level" window. A second window displays an image that is larger than the window, such that the window only displays a portion of the underlying image at a time. This window may be referred to as a "second level" window. The image for each window is independent of the image in the other window—that is, each image is stored as a separate image, although the images may be related in terms of what is shown in the images, or the images may even be separate copies of the same image. The first level window displays an "indicator" that represents the position of the second level window relative to the second level window image. Unlike the scroll boxes of the prior art, the indicator of the present invention is movable in two dimensions about the first level window. For example, if the second level window is positioned such that it shows the central portion of its underlying image, the indicator would be positioned in the center of the first level window. If the second level window is positioned such the it shows the lower right hand corner of the underlying image, the indicator would be positioned in the lower right hand corner of the first level window. Examples of indicators that may be used include, but are not limited to, icons, cursors, wire frame boxes, and highlighting.

In addition to indicating the position of the second level window with respect to its underlying image, the indicator in the first level window can be used to navigate the second level window image. To navigate the second level window image, the indicator is moved, for example by dragging it with a mouse, from one location to another in the first level window. As the mouse is moved, the position of the second level window with respect to its underlying image changes such that the position of the second level window with respect to its underlying image corresponds in a relative manner to the position of the indicator with respect to the first level image shown in the first level window. Besides dragging the indicator with a mouse, a variety of other means may be used to change the indicator's position with respect to the first level window. For example, in one embodiment of the invention, "clicking" on any location of the first level window with a mouse repositions the indicator at the location clicked.

The present invention may be also be used with multiple levels of windows. In one multiple level embodiment, a hierarchy of windows is used, with each lower level window being navigable by means of an indicator in the next higher level window. In certain embodiments of the present invention, graphic objects or items may be added by a user to any window, with corresponding graphic objects or items automatically being added to the other windows.

The present invention may be implemented by appropriate software running in a general purpose computer system comprising a central processing unit, a keyboard, internal memory, a mouse, and a computer display. The present invention may also be implemented in dedicated or special purpose computer systems, such as bank teller machines and reservations systems, and in other systems comprising display means, such as television sets, navigational devices, video games, motion simulators, and the like.

DETAILED DESCRIPTION OF THE INVENTION

In the following description, numerous specific details are set forth in order to provide a more thorough understanding of the present invention. It will be apparent, however, to one skilled in the art, that the present invention may be practiced without these specific details. In other instances, well-known features have not been described in detail in order not to unnecessarily obscure the present invention.

Figure 5:
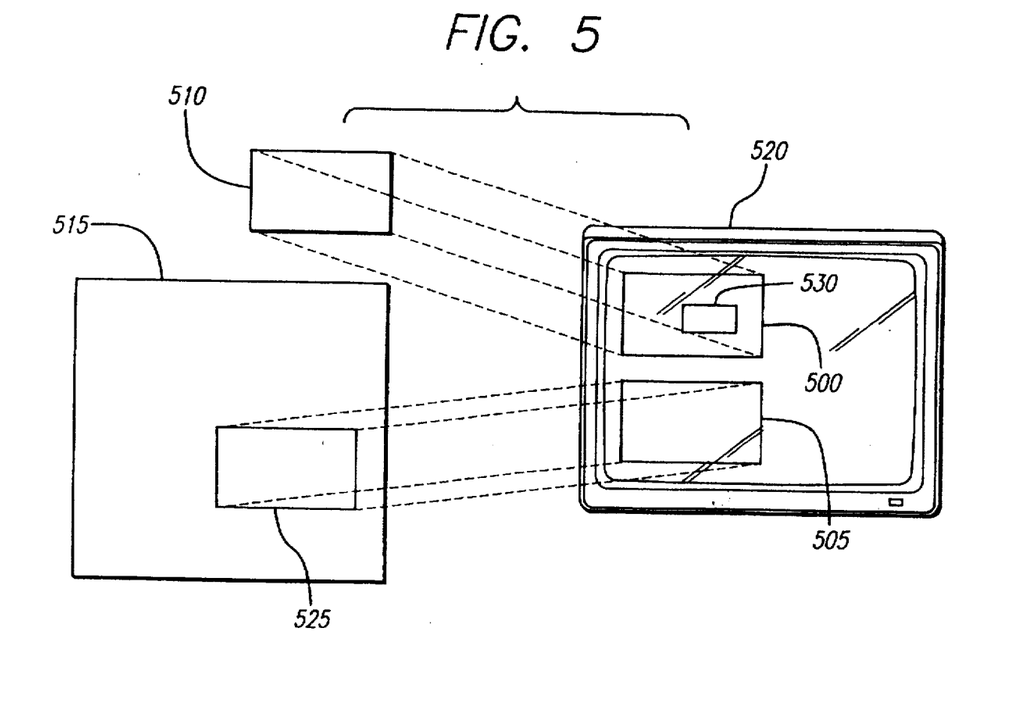
FIG. 5 shows the relationship between windows and underlying images in an embodiment of the present invention having two windows.

FIG. 5 illustrates an embodiment of the present invention with two windows and two underlying images. In the embodiment shown in FIG. 5, window 500 and window 505 are displayed on a computer display screen 520. Display screen 520 may be any kind of display screen, including but not limited to a cathode ray tube ("CRT") display, a liquid crystal display ("LCD"), a fluorescent display, and a projected display. Window 500 is associated with image 510. Window 505 is associated with image 515. In this embodiment, window 500 displays all of image 510, while window 505 shows only a portion of image 515. Window 500 contains a rectangular "indicator" 530 that indicates the relative position of the portion of image 515 shown in window 505 with respect to image 515 as a whole. This portion of image 515 is indicated by rectangle 525. Window 500 may be referred to as a "first level window." Window 505 may be referred to as a "second level window."

Figure 6:
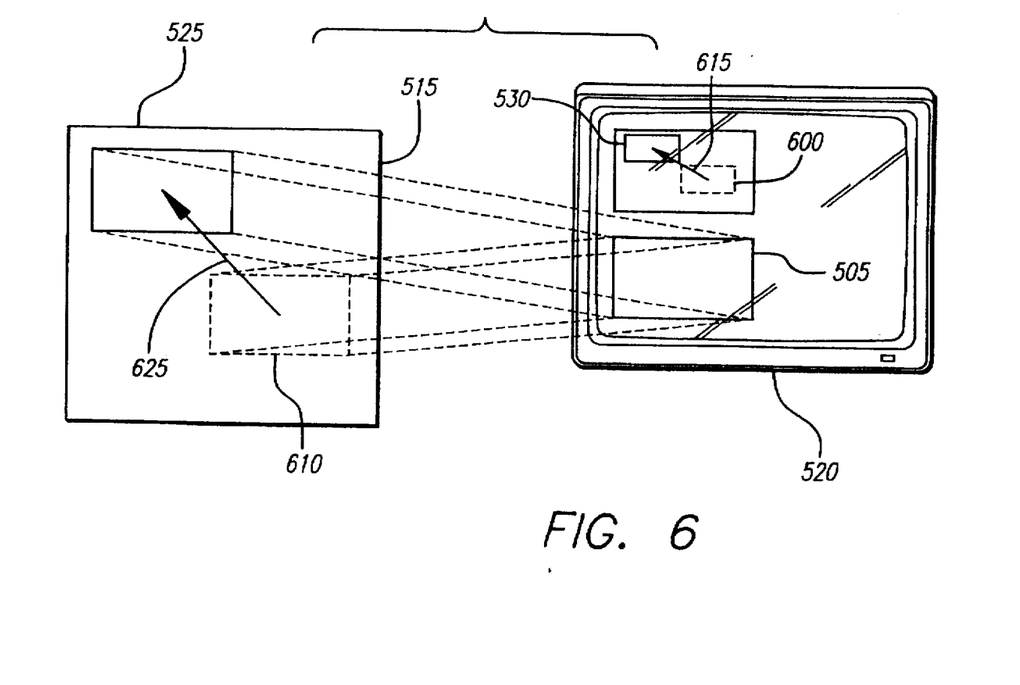
FIG. 6 shows the effect of changing the position of an indicator in one window on the portion of the image displayed in a second window for the embodiment shown in FIG. 5.

Indicator 530 allows a user to navigate second level window 505 about underlying image 515. The position of indicator 530 relative to first level window 500 corresponds to the position of second level window 505 with respect to image 515. By changing the position of indicator 530 relative to first level window 500, the position of the portion of image 515 shown in second level window 505 changes in a corresponding manner. A variety of means may be used to change the position of indicator 530. Examples include "dragging" indicator 530 with a mouse, or positioning a cursor at a desired position for indicator 530 and clicking a mouse button, causing indicator 530 to move to the new desired location. FIG. 6 shows how when indicator 530 is moved from its former position 600 along the direction indicated by arrow 615, the position of rectangle 525, representing the portion of image 515 displayed in second level window 505, moves from its original location 610 in the direction indicated by arrow 625 in a similar manner.

Figure 8:
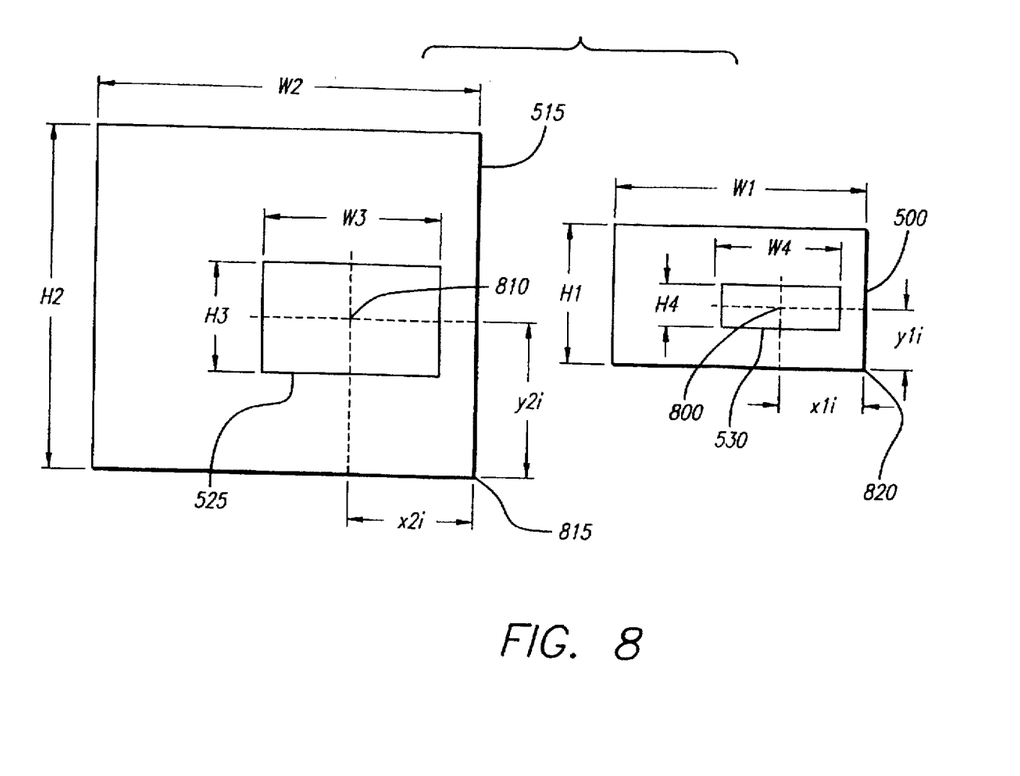
FIG. 8 shows the proportional relationship between the position of an indicator in one window with the position of a second window with respect to its underlying image in one embodiment of the present invention.

FIG. 8 shows how the size and position of indicator 530 in first level window 500 of the embodiment of the invention shown in FIG. 5 is related to the size and relative position of the portion 525 of image 515 shown in second level window 505. As shown in FIG. 8, image 515 has a height "H2" and a width "W2." Rectangle 525, which represents the portion of image 515 displayed in second level window 505, has a height "H3" and a width "W3." The center 810 of rectangle 525 is located a horizontal distance "$x2_i$" and a vertical distance "$y2_i$" from a reference point 815 at the lower left corner of image 515.

Also shown in FIG. 8 is first level window 500 containing indicator 530. As shown in FIG. 8, first level window 500 has a height "H1" and a width "W1." Indicator 530 has a height "H4," a width "W4," and a center 800 located a horizontal distance "$x1_i$" and a vertical distance "$y1_i$" from a reference point 820 located at the lower left corner of first level window 500.

In the embodiment shown in FIG. 8, the ratio of each horizontal distance and dimension with respect to image 515 to the corresponding horizontal distance and dimension with respect to first level window 500 is set to a constant $k_1$ that is equal to ratio of the width "W2" of image 515 to the width "W1" of first level window 500. Thus, $k_1 = W2/W1$. In a similar manner, the ratio of each vertical distance and dimension with respect to image 515 to the corresponding vertical distance and dimension with respect to first level window 500 is set to a constant $k_2$ that is equal to ratio of the height "H2" of image 515 to the height "H1" of first level window 500. Thus, $k_2 = H2/H1$. Stated differently, the coordinates (x2, y2) of any point in image 515 are related to the coordinates (x1, y1) of any point in first level window 500 by the following functions (a) and (b):

(a): $x2 = (k_1)(x1)$ (b): $y2 = (k_2)(y1)$ where $k_1 = W2/W1$ and $k_2 = H2/H1$.

Functions (a) and (b) thus define the coordinates of any point in image 515 in terms of the coordinates of any point in first level window 500 for the embodiment shown in FIG. 8. Because first level window 500 displays the entire image 510, defining the coordinates of points in image 515 in terms of the coordinates of points in window 500 is equivalent to defining coordinates of points in image 515 in terms of coordinates of points in image 510. In the more general case, where a higher level window does not display all of the underlying image, it may be desirable to define points in a lower level window in terms of points in the image underlying the higher level window rather that the higher level window itself.

Functions (a) and (b) describe an essentially linear relationship between the coordinates of a point in first level image 510 and a point in second level image 515. In other embodiments, there may be a different functional relationship between second level image 515 and first level image 500. Any functional relationship that provides a definite functional relationship between a point in a higher level image and a point in a lower level image may be used with the present invention. A general statement of such a function is:

$P_2 = f(P_1)$ where:

$P_1$ is a point in an upper level image $P_2$ is a corresponding point in a lower level image The functions relating the images to each other may have many parts and be quite complex. The images need not be rectangular as in the embodiment of FIG. 6, and need not all have the same general shape. For example, one image may be rectangular, while another is circular or oval, or each may have a completely irregular shape. All that is required is that the relationship between points in one image and points in another is somehow defined.

For the embodiment shown in FIG. 6, functions (a) and (b) can be used to determine a distance D2 between two points $(x2_f, y2_f)$ and $(x2_i, y2_i)$ in image 515 based on the coordinates of the two corresponding points $(x1_f, y1_f)$ and $(x1_i, y1_i)$ in first level window 500:

(c): $D2 = SQRT[(x2_f - x2_i)^2 + (y2_f - y2_i)^2] = SQRT[k_1^2(x1_f - x1_i)^2 + k_2^2(y1_f - y1_i)^2]$

For horizontal distances, y1 is a constant. Accordingly, equation (c) reduces to:

(d) $D2_x = SQRT[k_1^2(x1_f - x1_i)^2] = k_1(x1_f - x1_i) = k_1 D1_x$ where $D2_x$ = the horizontal distance between the points in image 515, and $D1_x$ = the horizontal distance between the corresponding points in first level window 500.

Similarly, for vertical distances, x1 is constant. Accordingly, equation (c) reduces to:

(e) $D2_y = SQRT[k_2^2(y1_f - y1_i)^2] = k_2(y1_f - y1_i) = k_2 D1_y$ where $D2_y$ = the vertical distance between the points in image 515, and $D1_y$ = the vertical distance between the corresponding points in first level window 500.

For an illustrative example, assume that image 515 is a bitmap having a width W2 of 800 pixels and a height H2 of 720 pixels, that first level window 500 has a width W1 of 400 pixels and a height H1 of 240 pixels, and that rectangle 525 (which corresponds to the size to second level window 505) has a width W3 of 400 pixels and a height H3 of 240 pixels. In this example, therefore:

$k_1 = W2/W1 = 800/400 = 2$ $k_2 = H2/H1 = 720/240 = 3$

Using these numbers, several other parameters can be calculated. For example, in the embodiment of FIG. 8, if it is desired that the size of indicator 530 with respect to window 500 is the same as the size of rectangle 525 with respect to image 515, its dimensions can be calculated using equations (d) and (e). The width W4 of indicator 530 can be calculated using equation (d), and the height H4 of indicator 530 can be calculated using equation (e), as follows:

$W3 = D2_x = k_1 D1_x = k_1(W4)$ $W4 = W3/k_1 = 400/2 = 200$ pixels.

$H3 = D2_y = k_2 D1_y = k_2(H4)$ $H4 = H3/k_2 = 240/3 = 80$ pixels.

An indicator with dimensions of 200 pixels wide by 80 pixels high in first level window 500 therefore has the same size relative to first level window 500 as the portion of image 515 shown in window 505 and represented by rectangle 525 has to image 515 as a whole. Although in many cases it is desirable that the size of indicator 530 is proportional to the size of the portion of image 515 shown in second level window 505, in other instances it may be desirable that indicator 530 has a larger or smaller size and/or shape. In general, any indicator that has a reference point associated with it that corresponds to a reference point associated with the window for which the position of the indicator determines the portion of image displayed can be used with the present invention.

Figure 9:
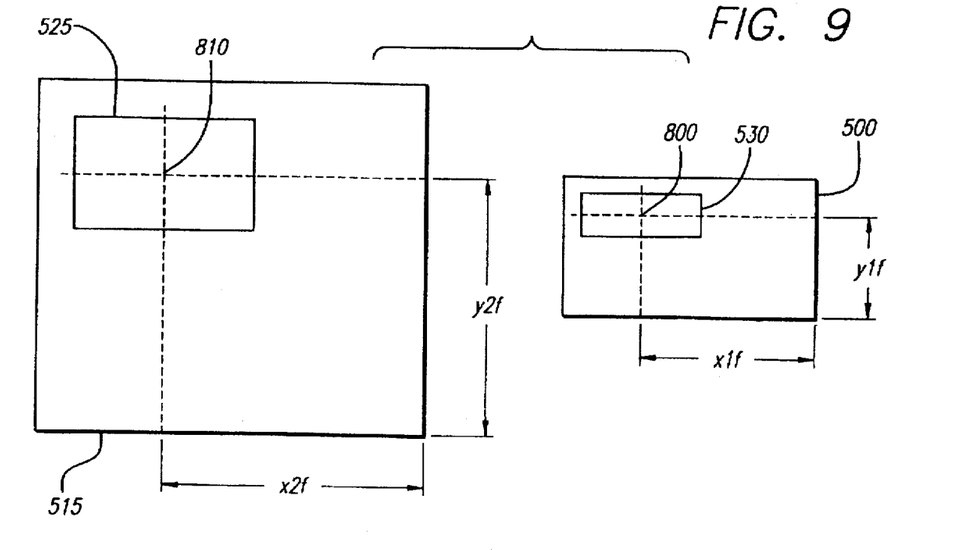
FIG. 9 shows how moving the indicator of FIG. 8 to a new location changes the corresponding position of the second window with respect to its underlying image.

In the embodiment shown in FIGS. 6, 8 and 9, the portion of image 515 shown in second level window 505 (indicated by rectangle 525) is determined from the coordinates of the center 800 of indicator 530. In this embodiment, the center 800 is therefore the reference point for indicator 530. Assuming that the coordinates $(x1_i, y1_i)$ of center 800 for the initial position of indicator 530 shown in FIG. 8 are (140, 100) (units in pixels), the corresponding coordinates $(x2_i, y2_i)$ of the center 810 of rectangle 525 can be calculated from the coordinates of the center 800 of indicator 530 using the functions (a) and (b) listed above:

$x2_i = k_1 x1_i = (2)(140) = 280$ pixels $y2_i = k_2 y1_i = (3)(100) = 300$ pixels The coordinates of center 810 of rectangle 525 are therefore (280, 300).

FIG. 9 shows the position of indicator 530 in first level window 500 after it has been moved from its position in FIG. 8 in the manner shown in FIG. 6. In its new location, the coordinates of the center 800 of indicator 530 are $(x1_f, y1_f)$. The coordinates $(x2_f, y2_f)$ of the center 810 of rectangle 525 corresponding to the new location of indicator 530 can again be calculated from the coordinates of the center 800 of indicator 530 using the functions (a) and (b). If, for example, the new coordinates of the center 800 of indicator 530 are (300, 200), the new coordinates of center 810 of rectangle 525, are:

$x2_f = k_1 x1_f = (2)(300) = 600$ pixels $y2_f = k_2 y1_f = (3)(200) = 600$ pixels In this manner, the portion of image 515 located in rectangle 525 at the new location may be determined so that it may be displayed in second level window 505.

Figure 7:
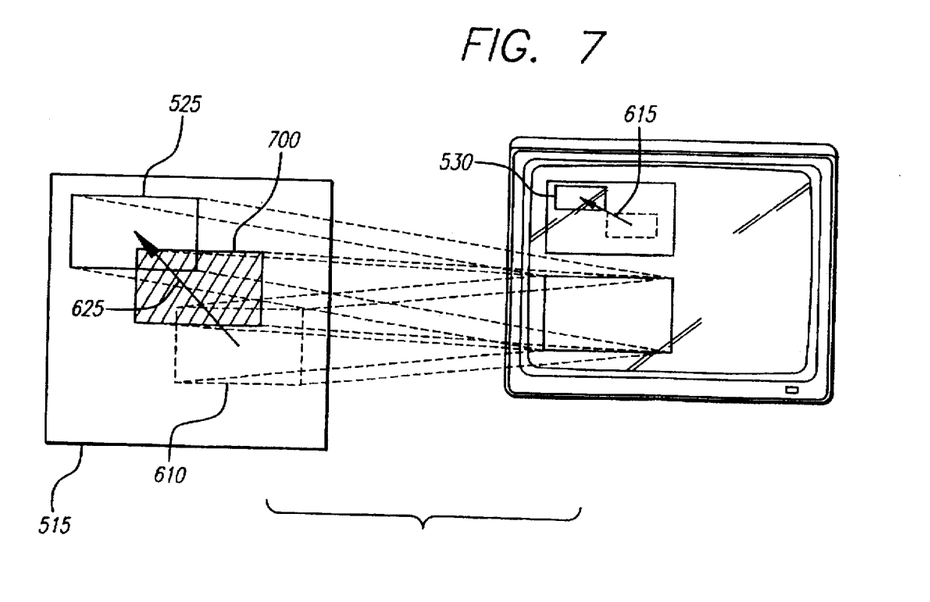
FIG. 7 shows the effect of changing the position of an indicator in one window on the portions of the image displayed in a second window for an embodiment of the invention incorporating smooth scrolling.

In certain embodiments of the present invention, only portions of image 515 corresponding to the initial and final positions of indicator 530 are displayed in second level window 530. In other embodiments, intermediate portions of image 515 are displayed to create the appearance of smooth scrolling from an initial to a final position. FIG. 7 shows an example of an embodiment in which an intermediate portion 700 of image 515 is displayed between the initial portion of image 515 indicated by the outline 610 and the portion indicated by the final position of rectangle 525. In the embodiment of FIG. 7, since only one intermediate portion is shown, the transition from the initial portion of image 515 shown in window 505 to the final portion of image 515 shown in window 505 will have a jerky appearance. By displaying additional intermediate portions of image 515 in window 505, a smoother transition may be attained.

The number and position of the intermediate portions displayed may be determined in a variety of ways, and may depend on factors such as the distance the indicator is moved in the first level window, the ratio of the size of the first level window to the second level window, whether the indicator is moved by dragging it or by clicking on a new location, and on a trade-off between the increase in the smoothness of scrolling associated with increasing numbers of intermediate portions and the decrease in response time associated with increased overhead resulting from such increasing numbers of intermediate portions displayed.

In one embodiment of the present invention, one or more intermediate portions of the image 515 is displayed in second level window 505 for each change in position of center 800 of indicator 530 in window 500 that is equal to a predetermined increment, or for each change in the position of center 810 of rectangle 525 with respect to image 515 that is equal to a predetermined increment. For example, for the embodiment shown in FIGS. 8 and 9 described above in which the first level window 500 has dimensions of 400 by 240 pixels, an increment of size 20 pixels for the movement of the center 800 of indicator 530 may be selected. In the example shown in FIGS. 8 and 9, the center 800 of indicator 530 moved from an original location (140,100) to a final location (300, 200). The total distance moved by center 800 is:

$$SQRT[(300-140)^2+(200-100)^2]=188.67$$

Using the criteria of an intermediate position for each incremental movement of 20 pixels, a total of nine intermediate positions would be displayed in this example. Choosing a smaller increment increases the number of intermediate positions, and accordingly increases the smoothness of the scrolling. An increment of 10 pixels would result in eighteen intermediate positions being displayed. An increment of one pixel would result in one-hundred eighty eight intermediate positions being displayed.

In some embodiments, it is desirable that an increment smaller than one pixel is used. An example of such an embodiment is one in which the second level image is several times the size of the first level image. In such an embodiment, moving one pixel in the first level window is equivalent to moving several pixels with respect to the second level image. Accordingly, for each pixel the indicator is moved in the first level window, it may be desirable to display several intermediate positions of the second level window with respect to the second level image. If, for example, it is desired to display four intermediate positions for the second level window for each one pixel moved by the first level indicator, the equivalent specified increment is one-quarter pixel.

Two examples of how indicator 530 can be moved from one location to another are by positioning a mouse cursor at the desired location of the center 800 of indicator 530 and clicking a mouse button (in which case, depending on the specific implementation, indicator 530 "jumps" in a single step or moves smoothly in a straight line to the new location) or by clicking on and dragging indicator 530 with a mouse. In one embodiment of the invention, clicking on the indicator causes indicator 530 to be centered around the position of the cursor when the mouse when clicked, and dragging the mouse drags the center 800 of indicator 530 to a new location.

If the position of indicator 530 is changed by dragging with a mouse, in one embodiment of the invention, the position of the mouse, which represents the position of the center 800 of indicator 530, is monitored. Each time the center 800 of indicator 530 is moved an increment equal to the specified increment (or a specified multiple of the increments, if the increment is less than one pixel), the position of the center 800 of indicator 530 is recorded, and the corresponding position of the center 810 of rectangle 525 for each intermediate position is calculated using the functions that define the relationship between points in window 500 and points in image 515. These calculated positions of center 810 of rectangle 525 are then used to determine the portions of image 515 to be displayed in window 505, and those portions are sequentially displayed. As indicator 530 continues to be dragged by the mouse, this process is repeated each time the indicator has moved a distance equal to the specified increment or multiple of increments. When the mouse button is released, the final position of indicator 530 is determined, and the final portion of image 515 to be displayed in window 505 is determined and displayed.

If the position of indicator 530 is changed by clicking the mouse on the new desired location of center 800 of indicator 530, causing indicator 530 to move to the new position, the number and location of portions of image 515 to be displayed in second level window 505 may be determined by identifying a straight line path (which is coextensive with arrow 615 in FIG. 7) between the initial and final positions, determining points along that path located at increments equal to the specified increment, and then determining the portions of image 515 corresponding to the incremental points along the path in the same manner as for the dragging mode. Other methods for determining intermediate portions of 515 to be displayed in second level window 505 may also be used. As in the other examples, the smaller the specified increment, the greater the number of intermediate positions, and the smoother the scrolling.

Figure 10:
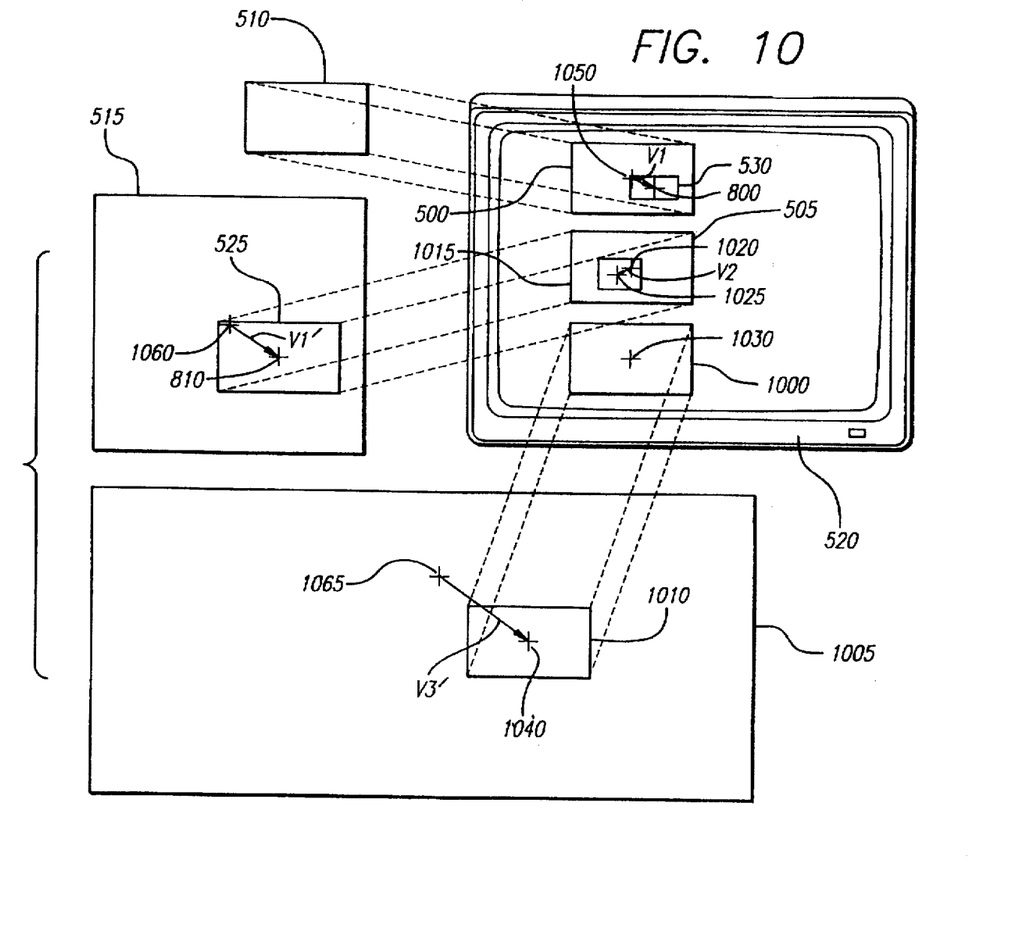
FIG. 10 shows an embodiment of the present invention with three windows.

The multiple image navigation method of the present invention is not limited to two windows and two images, but may be used with any number of windows, constrained only by system limitations of the particular computer system in which the invention is used. FIG. 10 shows an embodiment of the present invention incorporating a third level window 1000 and a third level image 1005, in addition first and second level windows 500 and 505, respectively, and first and second level images 510 and 515, respectively. Third level image 1005 is stored independently of first and second level images 510 and 515, though it may be related to image 510 and/or image 515 in theme and content. In the embodiment shown in FIG. 10, third level image 1005 is larger than either second level image 515 or first level image 510, while third level window 1000 is the same size as windows 500 and 505. However, all images and windows may be of arbitrary size and shape.

As in the two window embodiment shown in FIG. 5, all of image 510 is displayed in window 500, while only the portion of image 515 is displayed in window 505. An indicator 530 in window 500 is used to control the portion of image 515 displayed in window 505. Rectangle 525 indicates the portion of image 515 displayed in window 505. Because image 1005 is larger than third level window 1000, only a portion of image 1005 is displayed in window 1000. Rectangle 1010 indicates the portion of image 1005 displayed in window 1000.

In addition to indicator 530 located in first level window 500, the embodiment of FIG. 10 includes a second indicator 1015 located in window 505. In this embodiment, indicator 530 may be referred to as a "first level indicator" and indicator 1015 may be referred to as a "second level indicator." Second level indicator 1015 is used to determine the portion of image 1005 that is displayed in window 1000 in a manner similar to the manner that first level indicator 530 is used to determine the portion of image 515 that is displayed in second level window 505.

As in the embodiment shown in FIG. 5, in the embodiment of FIG. 10, there is defined a functional relationship between points $P_1$ in first level image 510 and a corresponding point $P_2$ in second level image 515:

$$P_2=f_1(P_1)$$

In a similar manner, there is defined a functional relationship between points $P_2$ in second level image 515 and a corresponding point $P_3$ in third level image 1010:

$P_3=f_2(P_2)$.

In addition, there is associated with first level indicator 530 a first reference point that is used to define a corresponding point in second level image 515 that is used to determine the portion of image 515 that is displayed in second level window 505. In the embodiment of FIG. 10, this first reference point is the center 800 of first level indicator 530, and it determines the portion of second level image 515 displayed in second level window 505 by defining a point 810 in image 515 that represents the position of the center 1020 of second level window 505 with respect to second level image 515. In a similar manner, there is associated with second level indicator 1015 a second reference point that is used to define a corresponding point in third level third level image 1005 that is used to determine the portion of image 1005 that is displayed in third level window 1000. In the embodiment of FIG. 10, this second reference point is the center 1025 of second level indicator 1015, and it determines the portion of third level image 1005 displayed in third level window 1000 by defining a point 1040 in image 1005 that represents the position of the center 1030 of third level window 1000 with respect to third level image 1005.

First level indicator 530 and second level indicator 1015 may be used to navigate images 515 and 1005 as follows. First level indicator may be moved by means of a mouse in the manner described for the two window embodiment of FIG. 5. As first level indicator is moved, its position with respect to a fixed reference point in first level window 500 is monitored. Any point in window 500 may be used as a fixed reference point. In the example described with respect to FIG. 5, the lower right-hand corner of first level window 500 was used as the fixed reference point to determine the position of center 800 of indicator 530. In the example of the embodiment of FIG. 10 described here, the center 1050 of first level window 500 is used. The position of center 800 of first level indicator 530 with respect to first level window 500 at any time may be viewed as a vector V1 with its tail at the center 1050 of window 500 and its head at the center 800 of indicator 530.

Second level indicator 1015 may be moved with respect to second level window 505 in the same manner that first level indicator 530 may be moved with respect to first level window 500. As second level indicator is moved, its position with respect to a reference point in second level window 505 is monitored. An example of a reference point that may be used is center 1020 of second level window 505. The position of center 1025 of second level indicator 1015 with respect to second level window 505 at any time may be viewed as a vector V2 with its tail at the center 1020 of second level window 505 and its head at the center 1025 of second level indicator 1015.

The portion of second level image 515 displayed in second level window 505 may be determined from vector V1. Using the function $f_1$ that defines the relationship between points in first level image 510 and second level image 515, vector V1' is calculated. Vector V1' represents a vector whose tail is at the center 1060 of second level image 515 and whose head is at the center 810 of rectangle 525 that indicates the portion of image 515 that is displayed in second level window 505. Vector V1 thus defines the portion of image 515 that is displayed in second level window 505.

The portion of third level image 1005 displayed in second level window 1000 may be determined in a similar manner from vectors V1' and V2. Vector V1' represents the offset of center 1020 of second level window 505 from the center of second level image 515. Vector V2 represents the offset of the center 1025 of second level indicator 1015 from the center 1020 of second level window 505. The sum V3 of V1' and V2 therefore represents the offset of the center 1025 of second level indicator 1015 from the center of image 515. The portion of third level image 1005 displayed in third level window 1000 may be determined from vector V3 the same way that the portion of second level image 515 displayed in second level window 505 is determined from vector V1. Using the function $f_2$ that defines the relationship between points in second level image 515 and third level image 1005, vector V3' is calculated. Vector V3' represents a vector whose tail is at the center 1065 of third level image 1005 and whose head is at the center 1040 of rectangle 1010 that indicates the portion of image 1005 that is displayed in third level window 1000. Vector V3, the sum of vectors V1' and V2, thus defines the portion of image 1005 that is displayed in third level window 1000.

In the embodiment shown in FIG. 10, moving first level indicator 530 with respect to first level window 500 causes the portion of image 515 displayed in second level window 505 to change, but does not change the relative position of second level indicator 1015 with respect to second level window 505. In this embodiment, moving first level indicator 530 changes vector V1, but does not cause a change in vector V2. Vector V2 is changed when second level indicator 1015 is moved within second level window 505. In other embodiments, moving first level indicator 530 may cause a change in the relative position of second level indicator 1015. For example, in one embodiment, the system may be designed such that whenever first level indicator 530 is moved, second level indicator 1015 is centered in second level window 505.

In the embodiment shown in FIG. 10, all of first level image 510 is displayed in first level window 500. In order to be able to be positioned over any desired portion of image 500, therefore, there is no need for first level indicator 530 to move beyond the boundaries of window 500. Indicator 530 is therefore constrained to move only within first level window 500. Attempting to move first level indicator 530 beyond a boundary of window 500 causes first level indicator 530 simply to abut the boundary.

The situation is different with respect to second level window 505, however. Second level image 515 is larger than second level window 505. Second level indicator 1015 cannot therefore be positioned over any desired portion of second level image 515 if indicator 1015 is constrained to remain only within the boundaries of second level window 505. In the embodiment shown in FIG. 10, second level indicator 1015 may be dragged across the boundaries of second level window 505. Doing so causes second level window 505 to scroll at a predetermined rate with respect to second level image 515 in a direction perpendicular to the boundary across which second level indicator 1015 has been moved. For example, if second level indicator 1015 is moved across the left boundary of second level window 505, second level window 505 scrolls to the left across second level image 515.

As second level window 505 scrolls in response to second level indicator 1015, the position of center 1020 of second level window 505 with respect to second level image 515 changes. Accordingly, the position of first level indicator 530 with respect to first level window 500 needs to be changed to correspond to the new location of the center 1020 of second level window 505. That may be accomplished by determining vector V1' for the new location of center 1020, and by means of the function defining the relationship between points in images 510 and 515 determining the vector V1 that identifies the corresponding location of first level indicator 530 with respect to first level window 500. The portion of third level image displayed in third level window 1000 may then be determined from vectors V1' and V2 as described above.

As in the two window embodiment of FIG. 7, when an indicator is moved, the windows that show portions of images as determined from the position of the indicator may dynamically scroll as the indicator is moved, may jump from an initial to a final image portion, and/or may show intermediate portions between initial and final image portions. In one embodiment of the invention, the portions of second level image displayed in second level window 505 are scrolled dynamically as first level indicator 530 is moved, while for the same movement of first level indicator 530, only portions of third level image 1005 corresponding to initial and final positions of first level indicator 530 are displayed in window 1005. In the same embodiment, the portions of third level image 1005 displayed in third level window 1000 are scrolled dynamically as second level indicator 1015 is moved.

In certain embodiments of the present invention, a window such as third level window 1000 in FIG. 10, that does not itself have an indicator, but that can be scrolled by moving an indicator in a higher level window (such as second level indicator 1015), may also be scrolled by dragging the window itself. In one example of such a draggable window, clicking a mouse in the window creates a "handle" by which the window can be dragged. As the window is dragged, any higher level windows and indicators are repositioned to correspond to the dragged window's new location.

Although three windows are used in the embodiment shown in FIG. 10, it will be apparent to those skilled in the art that the present invention may be extended to embodiments having any number of windows, depending on the response time desired and the hardware and software characteristics of a particular computer system.

Figure 11:
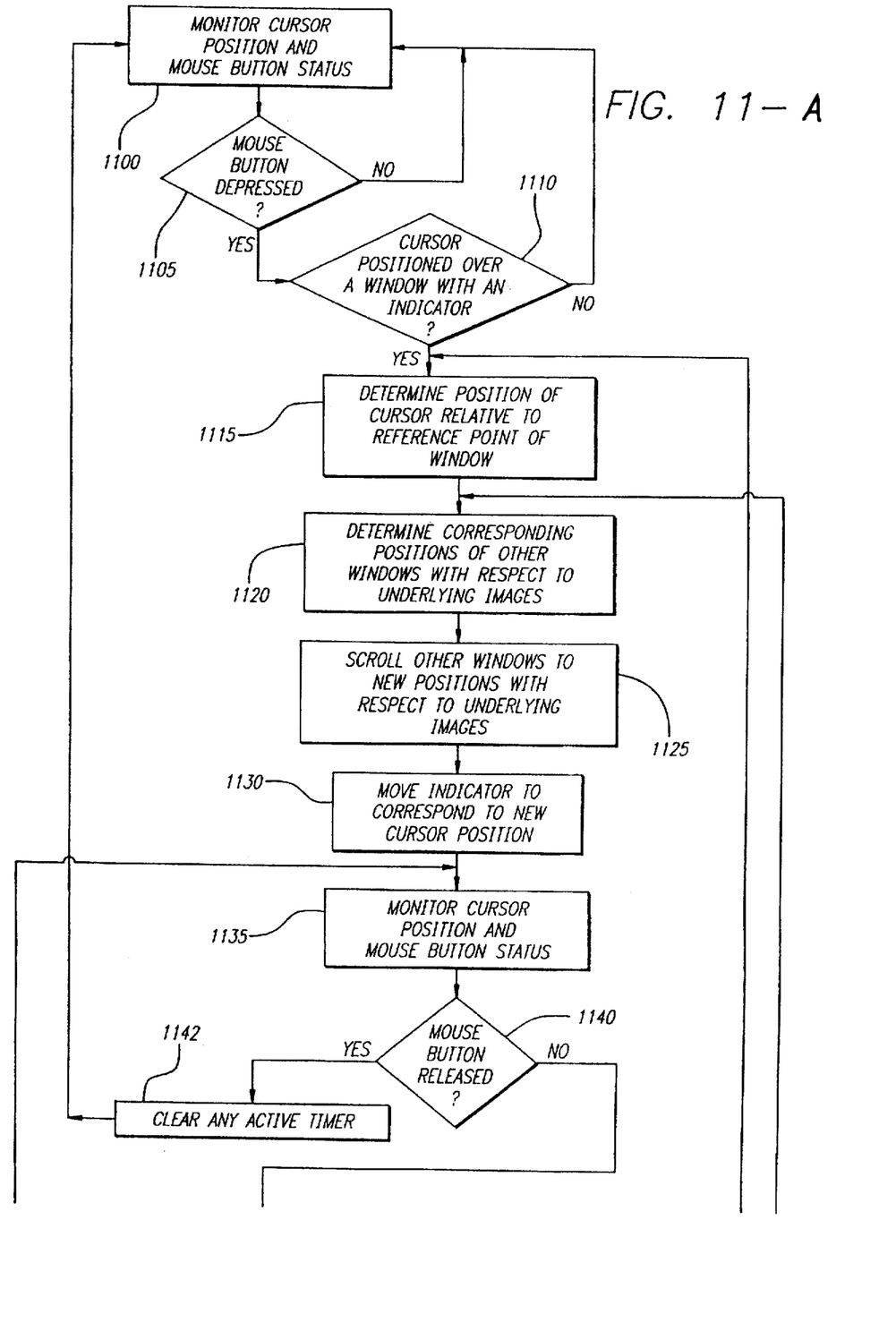
FIG. 11 shows a flow chart for one embodiment of the present invention.

FIG. 11 is a flow chart showing the steps used in one embodiment of the current invention featuring multiple indicators and multiple images.

Beginning at block 1100, the cursor position and mouse button status are monitored. At decision block 1105, further action is taken if the mouse button is depressed. Otherwise, the monitoring of the cursor position and mouse button status continues at block 1100.

If the cursor is not positioned over a window that has an indicator, no further action is taken and the cursor position and status continues to be monitored at block 1100. If the cursor is positioned over a window with an indicator when the mouse button is depressed, the position of the cursor with respect to a reference point of the window (such as the center of the window as in the embodiment of FIG. 10) is determined at block 1115. Next, at block 1120, the positions of the other windows with respect to their underlying images, corresponding to the new relative position of the cursor, are determined based on the functions that define the relations between points in the images underlying the various windows. At block 1125, the other windows are scrolled to the new positions determined at block 1120 by displaying intermediate portions of the underlying images as described with respect to the embodiment of FIG. 7 above. At block 1130, the indicator in the window in which the cursor is positioned is moved to correspond to the new cursor position.

At this point, the mouse button is depressed, the cursor is in a window with an indicator, and all windows and the indicator have been repositioned to correspond to the cursor position. At block 1135, the cursor position and mouse button status are again monitored.

If the mouse button remains pressed and the cursor position changes, as determined at decision block 1145, that is an indication that the indicator is being dragged by the mouse. Any active timer (any timer that is still running or any timer that has expired but has not been cleared, as described in more detail below) is cleared at block 1185. At decision block 1150, it is determined whether the new cursor position is outside the boundaries of the window. If it is not, the new cursor position is determined at block 1115, and from there the process continues as described above.

If the new cursor is outside the boundaries of the window, a timer is started at block 1190 and the cursor position and mouse button is again monitored beginning at block 1135. The timer ensures that actions that result from dragging the cursor outside of the window are initiated only if the cursor remains at rest outside the window with the mouse button pressed for a predetermined period of time. In one embodiment of the invention, this period of time is 20 milliseconds. As long as the mouse button remains depressed, the cursor position remains unchanged, and the timer has not expired, no further action will take place. A determination will be made at decision block 1140 that the mouse button has not been released. Following that, it will be determined at block 1145 that the cursor position has not changed, and at block 1195 that there is no active timer that has expired, and the cursor and mouse button status will again be monitored at block 1135.

If the mouse button remains depressed and the cursor position remains unchanged, eventually the timer will expire. When the timer has expired, as determined at decision block 1195, a decision is made at decision block 1155 as to whether the image underlying the window is larger than the window, which means that the window is a scrollable window (such as window 505 in FIG. 10), or whether the image underlying the window is not larger than the window, indicating that the whole image is displayed in the window so that there is no need for scrolling. If the window is a non-scrollable window, the indicator can move to the boundary of the window and no farther. Accordingly, at block 1160 the position of the indicator that corresponds to a position such that the indicator abuts the boundary of the window is determined. From this position, the corresponding positions of the other windows are determined at block 1120, and from there the process continues as before.

If at decision block 1155 it is found that the window is a scrollable window, then it is determined at decision block 1165 whether the window is positioned at the boundary of the underlying image in the direction in which the cursor is positioned, indicating that the window has already scrolled to the edge of the underlying image and can scroll no farther. If so, no further repositioning of windows takes place, and the cursor position and mouse button status are again monitored at block 1135.

If the window is not already at the boundary of the underlying image, it can be scrolled. Accordingly, the window is scrolled a predetermined increment in the direction corresponding to the cursor position at block 1170. In one embodiment of the invention, the rate at which the window is scrolled depends upon how far the cursor is moved outside of the window. Such scrolling requires that positions of the indicator(s) in other window(s) that indicate the position of the scrolled window must be changed to account for the scrolling of the window. The new corresponding positions of the other indicator(s) is determined at block 1175, and the indicators are moved to the new positions at block 1180. The timer is restarted at block 1182, and the corresponding positions of the other windows are then determined at block 1120 as before. The cursor position and mouse button status are again monitored at block 1135.

If the mouse button is released as determined at block 1140, any active timers are cleared at block 1142, and the process begins anew at block 1100. If the mouse button remains depressed but the cursor is moved, any active timers are cleared at block 1185 and the process resumes at block 1150.

If the mouse button remains depressed and the cursor remains positioned at its location outside of the window, the window will continue to scroll the predetermined increment for every cycle of the timer. In this circumstance, after it has been determined at decision blocks 1140, 1145, and 1195 that the mouse button has not been released, that the cursor position has not changed, and the timer that was reset at block 1182 has expired, the scrolling process begins again at decision block 1155.

In order to allow the appropriate portions of the images associated with the multiple windows of the present invention to be rapidly displayed, it is desirable that the images are stored in a computer system's RAM memory so as to be rapidly available. Since, however, the present invention is intended to be used with images including very large bitmaps (on the order of millions of pixels in size), system memory size limitations may prevent all images from being stored in RAM memory in uncompressed form. Accordingly, in certain embodiments of the invention, the images are compressed, using any of a variety of well known compression methodologies. The images are stored in compressed form, and are incrementally decompressed as required as the portion of an image displayed in a window is changed.

An additional feature of certain embodiments of the present invention is the ability to paste items into any of the displayed windows. For any item pasted into any window, a corresponding item is added to the images for the other windows in the corresponding location. The graphical representations of the items in each window are independent, and may be, but need not be, similar in appearance to the corresponding items in the other windows. An item may be nothing more than a graphic image or a string of text, or it may have additional items associated with it such as text or image data.

Figure 12:
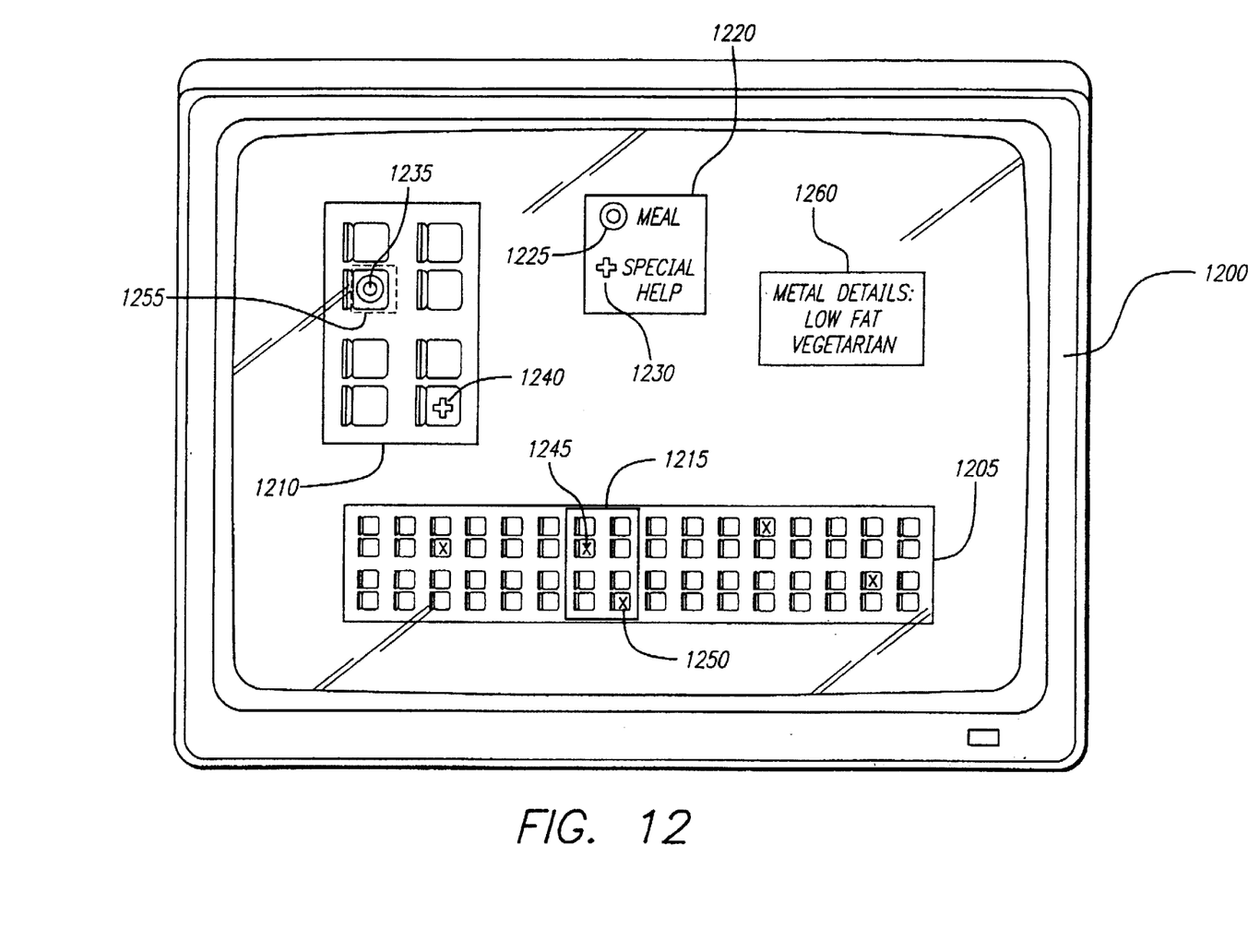
FIG. 12 shows an embodiment of the present invention in which data items may be added to images shown in windows.

FIG. 12 shows an example of a two window embodiment of the present invention that includes the feature of pasted items. FIG. 12 shows a display screen 1200 containing a first level window 1205 and a second level window 1210. First level window shows a seating chart for the passenger compartment of an airplane. Second level window 1210 shows a portion of a second level image comprising a larger scale image of a seating chart for the same airplane. First level indicator 1215, depicted as a rectangular frame, is used to select the portion of the second level image that is displayed in second level window 1210. For the embodiment shown in FIG. 12, indicator 1215 extends the full height of first level window 1205. Accordingly, first level indicator 1215 is constrained to move only to the left or the right. Moving first level indicator to the right or the left in first level window 1205 causes the portion of second level image displayed in second level window 1210 to scroll in the manner described above for the embodiments of the invention shown in FIGS. 5 to 10.

Display screen 1200 contains an item window 1220 that allows a user to select any of displayed items with a mouse or other means and "drag and drop" the selected item into either of first or second level windows 1205 and 1210, respectively. The two items available in the item window 1220 of the embodiment shown in FIG. 12 are a "Meal" item 1225 indicated by an icon in the shape of a dish and a "Special Help" item 1230 indicated by an icon in the shape of a first aid cross. Meal item 1225 may be used to indicate a seat at which a passenger requires a special meal. Special help item 1230 may be used to indicate a seat at which a passenger requires special assistance of some kind.

In the embodiment shown in FIG. 12, two items have been placed in the portion of the second level image displayed in second level window 1210: a "Meal" item 1235 and a "Help" item 1240. In second level window 1210, the same icons are used to indicate an item as are shown in item window 1220. In the embodiment shown in FIG. 12, placing an item in second level window causes a corresponding item to be placed in first level window 1205. However, in the embodiment of FIG. 12, different icons are used in first level window 1205 to indicate an item than in second level window 1210. In first level window 1205, a simple "x" is used to mark the location of any item, regardless of whether it is a "Meal" item or a "Help" item. Accordingly, "x" 1245 in first level window 1205 corresponds to "Meal" item 1235 in second level window 1210, and "x" 1250 in first level window 1205 corresponds to "Help" item 1240 in second level window 1210. Three other items are shown in first level window 1205. Corresponding items would be displayed in second level window 1210 if first level indicator were moved to the locations of these other items in first level window 1205.

The present invention allows data, in the form of text, graphics, video, sound or other form to be associated with a displayed item. In the embodiment shown in FIG. 12, the data associated with an item may be displayed by selecting the icon for the item displayed in second level window 1210. Various methods of selecting the item, such as "clicking" with a mouse may be used. Selecting an item in second level window 1210 causes an "active item" indicator to be displayed at the item selected and an item data window to be displayed on display screen 1200. FIG. 12 shows the display screen 1200 after "Meal" item 1235 has been selected with a mouse. Accordingly, "active item" indicator 1255 (consisting in this embodiment in a rectangular frame drawn in dotted lines) is displayed around item 1235 in second level window 1210, and item data window 1260 is displayed to the right of second level window 1210 at a predetermined position. The purpose of active item indicator 1255 is to indicate to the user with which item the data displayed in item data window 1260 is associated. The purpose of item data window 1260 is to display the data associated with the selected item.

In the embodiment shown in FIG. 12, the data associated with "Meal" item 1235 is the text: "Meal Details: Low Fat Vegetarian." In other embodiments, other or additional forms of data may be associated with an item. Such additional forms of data may be accessed by using a different manner of selecting the item (for example by "double clicking" on an item instead of "single clicking"), and item data window 1260 may provide a menu or other control means to allow a user to select which data the user desires to access. Upon such other data being accessed, it may be displayed in the same or in a separate window, or, in the case of sound data, may be played over a computer speaker or sound board. In certain embodiments of the invention, a user may be allowed to enter or edit data in a item data window that is to be associated with an item. In other embodiments, some or all of the data associated with an item may be displayed in a read-only manner.

Thus a novel system for displaying data in the form of multiple, independent windowed images, and for quickly and easily navigating such windowed images has been presented. Although certain specific illustrative embodiments have been described herein, it will be apparent to those skilled in the art that the present invention is not limited to those specific embodiments.

I claim:

1. A system for displaying images on a display means comprising:

a first window displaying a portion of a first image on said display means, said first image comprising a non-blank image containing image data;

a first indicator displayed at a first position with respect to said first window, said first indicator being movable in two dimensions with respect to said first window;

a first indicator control means for moving said first indicator from said first position with respect to said first window to a second position with respect to said first window;

a second window displaying a portion of a second image on said display means, said second window having dimensions independent of dimensions of said first window, said second image comprising a non-blank image comprising image data that is independent of said image data of said first image, said portion of said second image comprising less than a whole of said second image, said portion of said second image being determined by movement of said first indicator from said first position to said second position with respect to said first window such that a first portion of said second image is displayed in said second window when said first indicator is located at said first position with respect to said first window, a second portion of said second image is displayed in said second window when said first indicator is located at said second position with respect to said first window, and intermediate portions of said second image are displayed sequentially in said second window after said first portion is displayed in said second window and before said second portion is displayed in said second window.

2. The system of claim 1 wherein said portion of said first image displayed in said first window comprises a whole of said first image.

3. The system of claim 1 wherein said portion of said first image displayed in said first window comprises less than a whole of said first image.

4. The system of claim 1 wherein a content of said first image is thematically related to a content of said second image.

5. The system of claim 1 wherein said display means comprises a computer display.

6. The system of claim 1 wherein said first indicator comprises a highlighted region.

7. The system of claim 1 wherein said first indicator comprises an outline.

8. The system of claim 1 wherein said first indicator comprises an indicator having dimensions relative to said first image that correspond to dimensions of said second window relative to said second image.

9. A method for navigating images displayed on a display means comprising the steps of:

displaying in a first window on a display means a portion of a first image, said first image comprising a non-blank image containing image data;

displaying a first indicator at a first position with respect to said first window, said first indicator being movable in two dimensions with respect to said first window;

displaying in a second window on said display means a first portion of a second image based on said first position of said first indicator with respect to said first window, said first portion of said second image comprising less than a whole of said second image, said second image comprising a non-blank image comprising image data that is independent of said image data of said first image, said second window having dimensions independent of dimensions of said first window, moving by means of a first indicator control means said first indicator from said first position with respect to said first window to a second position with respect to said first window;

displaying a second portion of said second image in said second window based on said second position of said first indicator with respect to said first window after displaying intermediate portions of said second image in said second window between said first portion and said second portion of said second image.

10. The method of claim 9 wherein a content of said first image is thematically related to a content of said second image.

11. The method of claim 9 wherein said display means comprises a computer display.

12. The method of claim 9 wherein said first indicator comprises a highlighted region.

13. The method of claim 9 wherein said first indicator comprises an outline.

14. The method of claim 9 wherein said first indicator comprises an indicator having dimensions relative to said first image that correspond to dimensions of said second window relative to said second image.

* * * * *